(No Model.)

S. W. LERCH.
MANUFACTURE OF BRIDGE BARS.

No. 380,210. Patented Mar. 27, 1888.

Witnesses:
J. C. Turner
B. H. Sommers

Inventor:
Solomon W. Lerch
by Doubleday & Blin attys

UNITED STATES PATENT OFFICE.

SOLOMON W. LERCH, OF CANTON, OHIO, ASSIGNOR TO HIMSELF, EDWARD J. LANDOR, AND WILLIAM P. HALL, OF SAME PLACE.

MANUFACTURE OF BRIDGE-BARS.

SPECIFICATION forming part of Letters Patent No. 380,210, dated March 27, 1888.

Application filed November 16, 1887. Serial No. 255,329. (No model.)

*To all whom it may concern:*

Be it known that I, SOLOMON W. LERCH, a citizen of the United States, residing at Canton, in the county of Stark and State of Ohio, have invented certain new and useful Improvements in Bridge-Bars and Method of Manufacturing the Same, of which the following is a specification, reference being had therein to the accompanying drawings.

This invention relates to an improvement in the method of making articles of the character of the eye-bars used in bridges and for other purposes, and also to improvements in the articles themselves of the kind referred to.

The object is to produce an eye-bar in which the fiber of the metal around the eye proper and at the point of junction of the eye with the bar shall be situated relatively to the bar and the eye in a way differing from that of the fiber in these articles as heretofore constructed.

Figure 1:
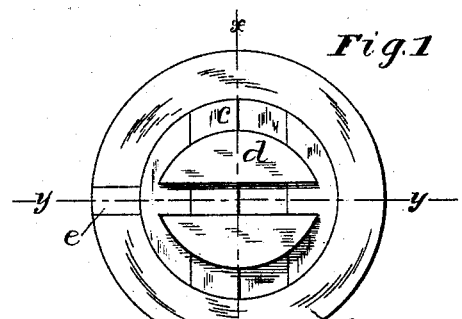
Figure 2:
Figure 3:
Figure 4:
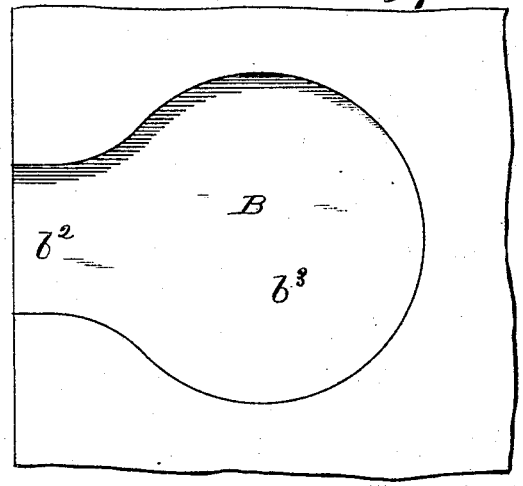
Figure 5:
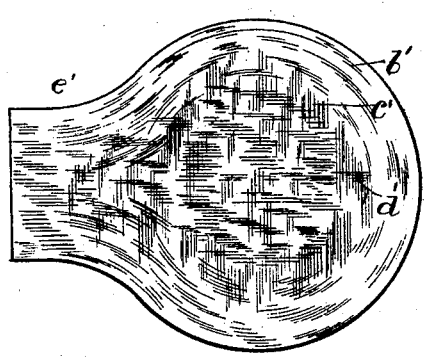
Figure 6:
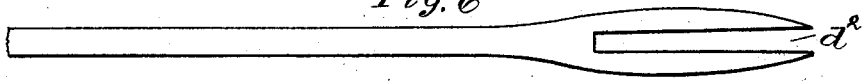
Figure 7:
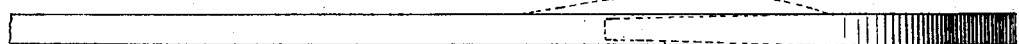
Figure 8:

Figure 1 is a plan view of the materials which are used to produce the eye portion proper, they being illustrated at the stage prior to their first welding. Fig. 2 is a cross-section on the line $y$ $y$, Fig. 1. Fig. 3 is a cross section on the line $x$ $x$, Fig. 2. Fig. 4 is a top plan view of the die which I prefer to use in welding together the parts of the eye. Fig. 5 shows the shape of the eye-piece after it has been withdrawn from the die. Fig. 6 is a side view of the bar before having the eye attached. Fig. 7 is a side view of the parts after being united, the initial position of the metal being indicated by dotted lines. Fig. 8 is a face view of that shown in Fig. 7, the direction of the main fibers being shown by broken lines.

In constructing the eye-piece, I take a plate, $a$, preferably circular, and upon it place a ring, $b$, within the interior of which ring there are arranged two or more series of pieces of scrap metal in the form of a pile. As shown, there are two series, the pieces of one at $c$ being arranged transversely to those of the other at $d$. After the parts of the eye-piece have been thus disposed they are heated to the proper degree of temperature and placed in the die B, having the required shape shown in Fig. 4, there being a main chamber at $b^3$ and a throatway at $b^2$. The metal is then subjected to the requisite pressure, the result of which is to weld together the several pieces, including the base-plate $a$, the ring $b$, and the interior rectilineal pieces $c$ and $d$, which were originally arranged transversely of each other. The fibers of the metal immediately around the central part of the eye (indicated by $d'$ $c'$, Figs. 5 and 8) lie rectilineally after the swaging and welding, and in this respect are in contradistinction to the fibers of the metal around the centers of the eyes of the bridge bars as they are ordinarily made. The fibers at $b'$ of the part which was initially in ring $b$ continue to occupy the curvilineal positions. This ring is not continuous, but has a portion cut away at $e$, which, during the operation of welding, is placed so as to coincide with the throatway $b^2$ in the die; and by examining Figs. 1 and 2 it will be seen that the pieces of metal $c$ and $d$ are of such number and size that there is a surplus of metal in the center, and this, during the operation of welding, is forced out through the throat at $b^2$; and when the metal is removed from the die it will be found to have a lateral projection, as shown at $e'$, Fig. 5, the fibers of which projection lie substantially radial to the eye-piece. By means of these straight fibers a firmer union of the eye with the stem or shank of the bar can be attained than is ordinarily the case where reliance is placed upon the fibers which lie concentric with the eye.

The stem or shank referred to is illustrated at D. At the end, as at $d'$, it is split or slotted to such an extent as experiments may determine to be necessary, and a surplus of metal is crowded into that part around the slot, as shown at $d^3$. After the eye-piece has been completed to the extent above described it is inserted into the slot $d^2$ in the end of the stem or shank, the projection at $e'$ being arranged substantially parallel to its longitudinal lines. The eye and the shank are again heated to the required temperature and subjected to the ordinary swaging and welding operation until the two parts are firmly united together. By following this manner of construction and by employing the parts described I produce a bar of greater strength than any of those now in use by reason of the peculiar positions of the fibers around the eye and of those at the place of union of the eye to the shank and on account of the extent of welding-surface between the shank and the eye-piece. As heretofore made the eye portions of these bars have been liable to fracture when under strain by reason of the fact that the strain was exerted upon lines transverse to a large proportion of the fibers of the eye. With an article of the character of that herein described the strain is exerted more largely in the direction of the fibers around the center of the eye, and is therefore resisted with greater advantage.

While I have herein provided for a circular base-plate, $a$, to hold the pieces of metal which are placed inside of the ring, it will be understood that the main feature of this part of the invention consists in providing an annular or ring-like holder in which can be placed a pile of transversely-arranged pieces of metal, so that the fibers of the interior and exterior parts can be brought into relative positions, such as are herein described.

What I claim is—

1. The herein-described method for making an eye-piece for bridge-bars and other similar articles, it consisting in first forming an annular holder, then filling the interior of the said holder with a pile of metallic parts, some transverse to others, then welding the aforesaid parts together, and subsequently forming an aperture at the center, substantially as described.

2. The herein-described method for making the eye-piece of a bridge-bar or similar article, it consisting in first forming an annular holder or receptacle, then placing therein a pile of metallic pieces of metal, arranged substantially as described, then welding the aforesaid parts together, and while welding crowding a portion of the said interior material outward to form a radial projection with its fibers, arranged substantially as described, and for the purposes set forth.

3. The herein-described method for making bridge-bars and other similar articles, it consisting in providing a metallic holder, placing in the interior of said holder a pile of metallic pieces adapted to be welded, then welding the aforesaid materials together, and while welding crowding a portion of the metal outward to form a radial projection, and subsequently welding the aforesaid parts to the shank or stem of the bridge-bar or other article, as described.

4. The herein-described eye-pieces for bridge-bars or similar articles, consisting of the part $a$, the annular part $b$, and the interior mass of metal, $c\ d$, all united by welding, the fibers of the parts $c\ d$ being substantially rectilinear, as set forth.

5. The herein-described eye-pieces for bridge-bars or similar articles, having an annular part, $b$, with its fibers extending around the eye, and the interior part, $c\ d$, having rectilineal fibers, substantially as described.

6. The herein-described eye-pieces for bridge-bars or similar articles, having a base portion, $a$, the annular part $b$, the fibers of which extend part way around the eye-piece, but are terminated to leave a space between them at the ends, and the interior portion, $c\ d$, having straight fibers, a portion of which is crowded between the terminals of the part $b$, substantially as described.

7. The herein-described eye-bars for bridges or similar structures, having the eye-piece formed of single metallic parts welded together, with more or less of the fibers thereof projecting radially from the eye-piece, and the stem or shank welded to the said eye-piece, substantially as set forth.

In testimony whereof I affix my signature in presence of two witnesses.

SOLOMON W. LERCH.

Witnesses:
HENRY FISHER,
JNO. S. CHARLESON.